Patented Oct. 12, 1943

2,331,596

UNITED STATES PATENT OFFICE 2,331,596

DEHYDROABIETANE AND METHOD OF PRODUCING

William P. Campbell, Newark, Del., assignor to Hercules Powder Company, Wilmington, Del., a corporation of Delaware No Drawing. Application August 11, 1942, Serial No. 454,456

5 Claims. (Cl. 260—666)

This invention relates to a new composition of matter and to a method for its production. More particularly, it relates to dehydroabietane as a new composition of matter and to a method of production thereof.

While many derivatives of dehydroabietic acid have been described in the art, no mention has been made of the preparation or existence of the hydrocarbon containing the hydrocarbon nucleus of dehydroabietic acid and the carboxyl group substituted by the methyl group.

Now, in accordance with this invention, it has been discovered that the hydrocarbon corresponding to dehydroabietic acid with the methyl group substituted for the carboxyl group may be prepared. This new hydrocarbon, referred to as dehydroabietane, is a soft waxy solid possessing properties making it of considerable interest for many uses. Its method of preparation, in accordance with this invention, involves the reduction of dehydroabietinal semicarbazone.

Dehydroabietane is believed to have the following structural formula:

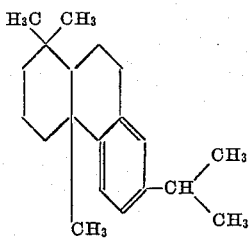

The following example illustrates the method of producing dehydroabietane described in accordance with this invention:

Example

Ten parts by weight of dehydroabietinal semicarbazone, formed by reaction of dehydroabietinal with semicarbazide, were heated with 15 parts by weight of solid sodium ethylate and 115 parts by weight of absolute ethyl alcohol in a sealed tube at 200° C. for 9 hours. The solvent was then evaporated, the reaction product extracted with ether, the ether solution washed with dilute hydrochloric acid, dried and the ether evaporated. The crude dehydroabietane resulting was sublimed at 1.5 mm. pressure, the sublimate solidifying rapidly to a waxy solid. This purified dehydroabietane had a melting point of 41–44° C. and amounted to 5.5 parts by weight, representing 70% of the theoretical yield. On combustion analysis it showed the following:

|  | Carbon | Hydrogen |
|---|---|---|
|  | Per cent | Per cent |
| Found | 88.65 | 11.29 |
| Calculated for $C_{20}H_{30}$ | 88.85 | 11.17 |

In carrying out the reduction with sodium ethylate and alcohol, elevated temperatures requiring use of pressures above atmospheric are necessary. The reduction by this method may be carried out conveniently at temperatures in the range of about 150 to about 230° C., the time of reaction being dependent on the particular temperature employed. Instead of sodium ethylate other metal alkoxides may be used, such as sodium methylate, sodium propylate, etc. Other lower aliphatic alcohols, such as methyl alcohol, propyl alcohol, butyl alcohol, etc., may be used in place of the ethyl alcohol shown.

The dehydroabietinal useful for preparing the semicarbazone used in the process of the invention may be prepared by a Rosenmund reduction of the acid chloride formed from dehydroabietic acid using a palladium-barium sulfate catalyst. The semicarbazone is formed by reaction of the dehydroabietinal with semicarbazide hydrochloride in methyl alcohol solution in the presence of a small amount of alkali, such as sodium bicarbonate. The semicarbazone has a melting point of 217–219° C. The preparation of dehydroabietinal and dehydroabietinal semicarbazone are described in my copending application, Serial No. 454,457, filed August 11, 1942.

Dehydroabietane is useful as an ingredient of greases, special lubricants, etc. It is also valuable as an intermediate for production of other compounds, such as by sulfonation, nitration, halogenation, etc.

What I claim and desire to protect by Letters Patent is:

1. As a new composition of matter, dehydroabietane.
2. The method of producing dehydroabietane which comprises reducing dehydroabietinal semicarbazone.
3. The method of producing dehydroabietane which comprises reducing dehydroabietinal semicarbazone with a metal alkoxide and an alcohol.
4. The method of producing dehydroabietane which comprises reducing dehydroabietinal semicarbazone with sodium ethylate and ethyl alcohol.
5. The method of producing dehydroabietane which comprises reducing dehydroabietinal semicarbazone by contacting with sodium ethylate and ethyl alcohol at a temperature within the range of about 150° C. to about 230° C.

WILLIAM P. CAMPBELL.